United States Patent [19]

Boucher et al.

[11] Patent Number: 4,484,959
[45] Date of Patent: Nov. 27, 1984

[54] PROCESS FOR THE PRODUCTION OF A COMPOSITE METAL PART AND PRODUCTS THUS OBTAINED

[75] Inventors: André Boucher, Fraisses; Bernard Marand, Saint-Etienne, both of France

[73] Assignee: Creusot-Loire, Paris, France

[21] Appl. No.: 394,984

[22] Filed: Jul. 2, 1982

[30] Foreign Application Priority Data

Jul. 17, 1981 [FR] France .................. 81 13939

[51] Int. Cl.³ .................. C21D 9/38; B21B 27/02; B23K 9/04; B23K 26/00
[52] U.S. Cl. .................. 148/127; 148/31.5; 428/682; 428/683; 428/553; 428/937; 29/132
[58] Field of Search .............. 428/937, 682, 683, 553; 29/132; 219/121 LM, 121 PL, 121 LG, 121 LE, 121 LF; 148/31.5, 127, 126

[56] References Cited

U.S. PATENT DOCUMENTS

| | | | |
|---|---|---|---|
| 3,310,423 | 3/1967 | Ingham | 219/121 LM |
| 3,623,850 | 11/1971 | Horvath | 428/682 |
| 3,719,790 | 3/1973 | Plöckinger et al. | 428/683 |
| 3,855,015 | 12/1974 | Nemoto et al. | 428/683 |
| 3,997,370 | 12/1976 | Horvath et al. | 428/682 |
| 4,004,889 | 1/1977 | Gale et al. | 428/683 |
| 4,015,106 | 3/1977 | Gnanamuthu et al. | 219/121 LM |
| 4,064,608 | 12/1977 | Jaeger | 29/132 |
| 4,104,505 | 8/1978 | Rayment et al. | 219/121 PL |
| 4,232,096 | 11/1980 | Franzer et al. | 428/683 |
| 4,323,756 | 4/1982 | Brown et al. | 219/121 LM |
| 4,436,791 | 3/1984 | Bocquet | 29/132 |

FOREIGN PATENT DOCUMENTS

| | | | |
|---|---|---|---|
| 2753475 | 6/1978 | Fed. Rep. of Germany | 428/683 |
| 2106939 | 5/1972 | France | 428/683 |
| 86670 | 6/1970 | Japan | 428/682 |
| 40777 | 12/1970 | Japan | 428/683 |
| 148120 | 11/1979 | Japan | 428/683 |

OTHER PUBLICATIONS

*Metals Handbook*, vol. 1, 9th ed., 1978, pp. 422–424, 439.
*Metal Progress*, Mid–Jun. 1978, pp. 20–21, 60–63, 70–73.

Primary Examiner—L. Dewayne Rutledge
Assistant Examiner—John J. Zimmerman
Attorney, Agent, or Firm—Pollock, VandeSande & Priddy

[57] ABSTRACT

The present invention relates to the production of metal parts whose core and surface must have different characteristics.

Its subject comprises firstly a process for the production of a composite metal part by coating or hard-surfacing a metal core of low-alloy structural steel with a harder metal layer composed of a high-speed chromium-tungsten or chromium-molybdenum steel or a high-speed steel containing chromium associated at the same time with a plurality of elements such as tungsten, molybdenum, vanadium, and cobalt, this process being at the same time characterized in that this high-speed steel has a hardness higher than 57 Rockwell C, in that the low-alloy steel which constitutes the metal core is selected to be compatible with the said high-speed steel, in that the said high-speed steel is applied exclusively in the form of a prealloyed powder, and in that the coating or hard-surfacing of the core with this powder is effected with the aid of one of the welding processes of the follow-group: welding by means of a transferred or semi-transferred arc plasma torch, or welding by means of a laser torch, the operation of coating or hard-surfacing by welding being followed by heat treatment.

Another subject of the invention comprises the products obtained by the abovedescribed process.

It is particularly applicable to the production of rolls for cold rolling mills, rolling or forming rollers, shear blades, wear plates, and armor plates.

15 Claims, 9 Drawing Figures

U.S. Patent   Nov. 27, 1984   Sheet 1 of 2   4,484,959
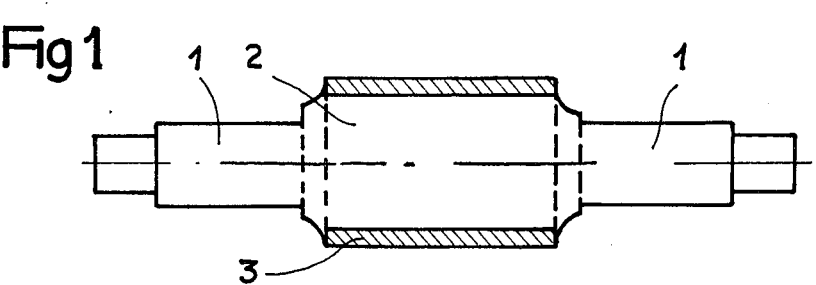
Fig 1
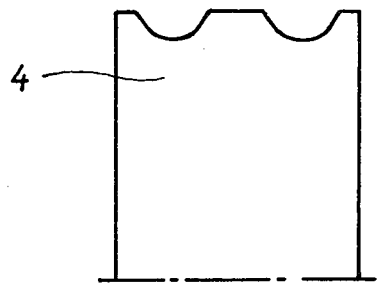
Fig 2a
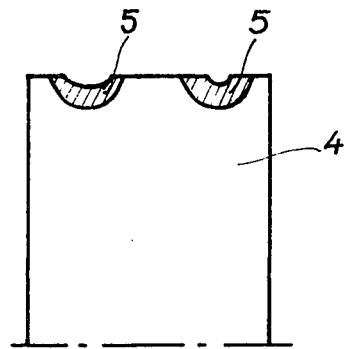
Fig 2b
Fig 2
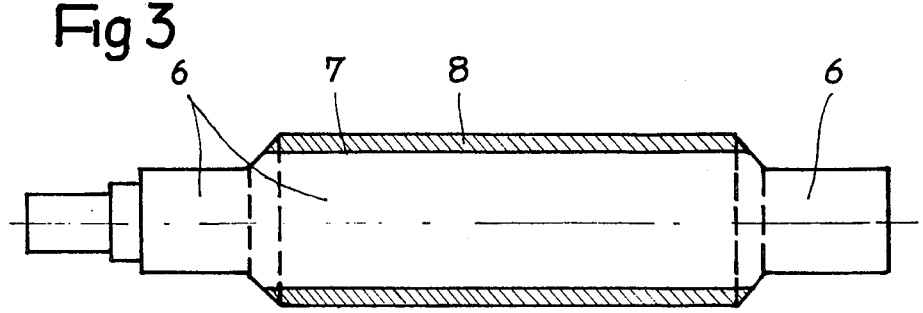
Fig 3

Fig 4
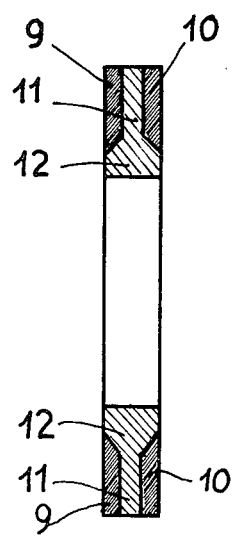
Fig 4a
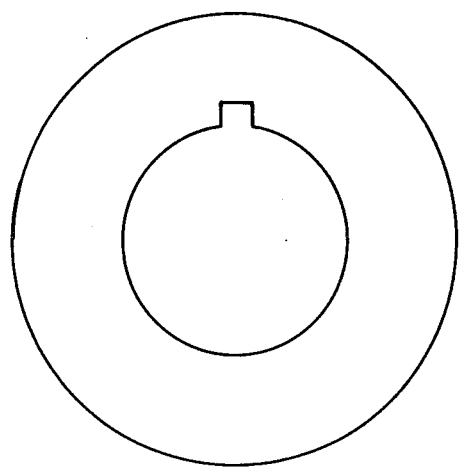
Fig 4b
Fig 5
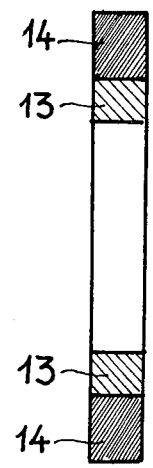
Fig 6
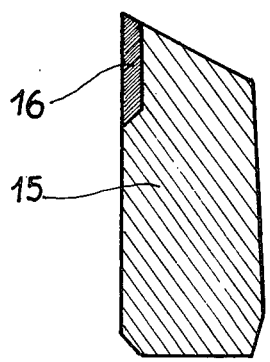
Fig 6a
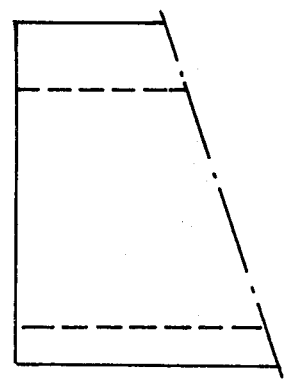
Fig 6b

PROCESS FOR THE PRODUCTION OF A COMPOSITE METAL PART AND PRODUCTS THUS OBTAINED

FIELD OF THE INVENTION

The present invention relates to the production of metal parts whose core and surface must have different, and often even contradictory characteristics, since they are subjected to stresses which are quite different in the core and on the surface.

This is the case, for example, with the rolls of cold rolling mills or with certain rolling or forming rollers, or again with blades of shearing machines, wear plates or armour plates.

For all these parts the core must have low fragility, and the surface must on the contrary have high tensile strength, fatigue strength, abrasion resistance, and great hardness.

PRIOR ART

These parts are traditionally made from a homogeneous material, their surface being subjected to a special heat treatment.

More recently, use has sometimes been made of composite metal parts.

In all cases, the production of these metal parts, in which the core and the surface undergo different stressing, entails difficult problems.

The difficulties encountered in the production of rolls for cold rolling mills will now be described by way of example.

Rolling is a metallurgical operation which consists in reducing the section of a solid hot or cold product by passing it between two bodies of revolution, known as rolling mill rolls. The rotation causes the product to pass between the two rolls, and the thickness of the product is reduced to the gap between the two generatrices of the rolls.

The products are rolled either in the hot state (up to 1200° C.), or in the cold state. In the first case, the stresses are above all of thermal origin, while they are essentially of mechanical origin in the second case.

The rolls of cold rolling mills must withstand three types of mechanical stressing:

(1) The cyclic deformations to which the entire roll is subjected, firstly through the bending stresses resulting on the one hand from the pressures applied to the journals and on the other hand from the reaction of the product rolled, and secondly through the torsional stresses resulting from the driving torque;

(2) The cyclic rolling stresses which are deduced from the Hertz contact theories. The compressive stresses attain very high values at the surface, while in the underlying layer the main shearing tension, acting in a plane oriented at 45° in relation to the direction of application of the load, has a maximum at a point called the "Hertz point". Compared with hot rolling, these Hertz stresses are considerable in the rolls of cold rolling mills, because the flow stresses of the cold metal are very high, particularly in the case of hard, strain hardened metal.

As an indication, evaluation of the stesses in a roll of a diameter equal to 600 mm leads to maximum compressive stresses of the order of 1000 to 1500 N/mm$^2$, and the maximum shearing tension at a depth of between 3 and 5 mm under the skin is of the order of 300 to 600 N/mm$^2$.

During the rotation of a roll, each fiber of this roll is cyclically stressed.

(3) The wear caused by the sliding of the product being rolled in the nip of the rolls. This wear results in deterioration of the surface of the rolls, which in turn impairs the appearance of the surface of the rolled product. The worn cylinder must be reconditioned by the removal of material.

These three categories of stresses impose contradictory properties on the roll:

The core must have moderate tensile strength of the order of 1000 MPa, accompanied by good resilience;

The working layer must have great resistance to cracking through fatigue, great hardness of 85 to 100 Shore (60 to 66 HRC*), a low coefficient of friction and high abrasion resistance.

(*) HRC=Hardness Rockwell C according to the Standard AFNOR No. NF A 03153.

Traditionally, the rolls of cold rolling mills are made of a homogeneous material. This material can only be a compromise which must provide at one and the same time the tenacity of the core and the strength of the working layer; the entire roll is treated for the level of strength required in the core, while the properties of wear resistance and fatigue strength are imparted to the working layer by a hardening treatment.

The great majority of rolls of cold rolling mills are thus made of grades of steel derived from 100 C 6, a steel containing 1% C and 1.5% Cr, or 85 CDV 7, a steel containing 0.85% C, 1.75% Cr, with a little molybdenum and a little vanadium, although these steels do not represent the optimum for the working layer.

For rolls of small diameters, and more particularly for those intended for multiroll stands, use may also be made of more highly carburized and higher-alloy steel grades, whose behavior in respect of wear is better than that of steels derived from 100 C6. These are chromium steels of the Z 150 CDV 12 type, a steel containing 1.5% C, 12% Cr, with a little molybdenum and a little vanadium, or steels derived therefrom.

For these last-mentioned rolls, intended for multiroll stands, important progress has been made by the use of high-speed vanadium steels. Their high content of vanadium carbides $V_4C_3$ very substantially increases wear resistance and the efficiency and life of the rolls. However, it is difficult to envisage the production of large rolls with these high-speed types of steel, because of the technological difficulties and the prohibitive cost.

Nevertheless, it is possible to extend to rolls of all diameters the advantage of the use of high-speed steels, if bimetallic rolls are made, in which only the working layer is composed of high-speed steel.

The composite construction principle is already used for the repair or manufacture of certain rolls for hot rolling. The working layer is restored to size, or formed, by depositing on the core of the roll a material suitable for use in hot rolling; this material is usually a low-alloy steel a little harder than the core of the roll and is selected for its good resistance to heat fatigue, and therefore of moderate hardness. This hard-surfacing is effected by means of a customary welding process, the most usual being the submerged-arc process using a weldable steel wire or strip. These hard-surfacing processes are suitable for rolls for hot rolling mills because the mechanical stresses to which these rolls are subjected are relatively moderate; they perish essentially through surface cracking of thermal origin and through hot wear, while rolling pressures entail only very low mechanical stresses in comparison with those undergone by a roll in a cold rolling mill.

By way of comparison, the working layer of cold rolling rolls requires more resistant materials and, above all, a very high metallurgical quality which is not obtained by the processes used for hard-surfacing hot rolling rolls; thus, in the working layer of cold rolls the inclusions or defects, beyond a critical size, may become sites for the commencement of fatigue cracking.

BRIEF DESCRIPTION OF THE DRAWINGS

FIG. 1, is a vertical section of the roll obtained after grinding machining.

FIG. 2a, is a vertical half-section of the blank for the roller, with its two circular grooves.

FIG. 2b, is a vertical half-section of the same roller after application of the invention and machining.

FIG. 3, is a vertical section of the roll after the final machining operation.

FIGS. 4a–4b and 5, is a circular shear blade after the application of the invention.

FIGS. 6a–6b, is a vertical section of a straight shear blade according to the invention.

SUMMARY OF THE INVENTION

The aim of the invention is to provide composite metal parts which have good resistance to stresses of high intensity, which are different in the core and on the surface, to an extent far greater than in known solutions, by simultaneously making use of the excellent properties of high-speed steels on the one hand and of the most modern welding processes on the other hand.

To this end, the subject of the present invention is a process for the production of a composite metal part by coating or hard-surfacing a metal core of low-alloy structural steel with a harder metal layer composed of a high-speed chromium-tungsten or chromium-molybdenum steel or a high-speed steel containing chromium associated at the same time with a plurality of elements such as tungsten, molybdenum, vanadium, and cobalt, this process being at the same time characterized in that this high-speed steel is so selected as to exhibit a hardness higher than 57 Rockwell C, in that the low-alloy steel forming the metal core is so selected as to ensure a non-fragile connection to the high-speed steel and to be compatible with the utilisation stresses of the part in question, in that the said high-speed steel is added solely in the form of a prealloyed powder, and in that the coating or hard-surfacing of the core with this powder is effected with the aid of one of the welding processes of the following group: welding by means of a transferred or semitransferred arc plasma torch or welding by means of a laser torch, the operation of coating or hard-surfacing by welding being followed by tempering heat treatment or by hardening and tempering heat treatment adapted to the nature of the powder used.

According to one particular characteristic of the present invention, the low-alloy structural steel which constitutes the metal core may advantageously have an analysis within the following range:

| C % = | 0.20 to 1. | Ni % = | 0 to 2.5 |
| Mn % = | 0.2 to 1.5 | Cr % = | 0.50 to 6 |
| Si % = | 0.20 to 1 | Mo % = | 0 to 2 |
| S % = | 0.005 to 0.200 | V % = | 0 to 0.50 |

A low-alloy structural steel of this kind is compatible with the welding of high-speed steels, in the sense that, taking into account the heat balance imposed by the welding and after suitable heat treatment, a hardness curve having no abrupt discontinuity at the weld, between the core and the welding metal, is obtained. In other words, a steel of this kind must make a tenacious joint with the high-speed steel to be welded on the surface, that is to say there must not be in the joint or in the underlying layer either a region of excessively weakened mechanical strength (which would entail the risk of the driving-in of the layer of high-speed steel) or a fragile region (which would entail the risk of the peeling-off of the layer of high-speed steel).

The heat treatment in the zone affected by the surfacing operation is imposed by the surfacing itself, and therefore the steel selected for the core must be one whose transformation points and softening curves are well suited to the welding heat balance, so that a joint and an underlying layer are obtained which are both tenacious.

According to another particular characteristic of the present invention, the high-speed steel powder, which after the welding forms the hard metal layer, has a composition within the range defined below:

| C % = | 0.5 to 2.6 | Mo % = | at most equal to 12 |
| Mn % = | 0.2 to 1.7 | W % = | at most equal to 20 |
| Si % = | 0.2 to 1.4 | V % = | at most equal to 10 |
| S % = | at most equal to 0.2 | Co % = | at most equal to 16 |
| Cr % = | 2 to 14 | | with: W % + V % + Mo % + Co % at least equal to 3. |

This high-speed steel powder may usefully contain in addition a content of boron at most equal to 2% and a content of silicon at most equal to 3%.

Finally, it may usefully have an aluminum content at most equal to 1.2%.

The invention also relates to all the composite metal products obtained by the previously mentioned processes, and in particular:

Rolls for cold rolling mills, whose core of low-alloy structural steel constitutes the central portion, while the harder metal layer of high-speed steel constitutes the surface layer which alone comes into contact with the products which are to be rolled.

Rollers for rolling or forming solid and hollow sections, whose core of low-alloy structural steel constitutes the central portion, while the harder metal layer of high-speed steel constitutes the surface layer which alone comes into contact with the products which are to be rolled or formed.

Circular or straight shear blades, whose core of low-alloy structural steel constitutes the actual shear blade, including the edges, these edges being coated or surfaced with a harder metal layer of high-speed steel, which alone comes into contact with the product which is to be sheared.

Wear plates and armour plates, whose core of low-alloy structural steel constitutes the thicker part and whose surface layer, which is harder and thinner, of high-speed steel constitutes the layer subjected to wear or to the shock of projectiles.

Depending on the nature of the products to be obtained, the following must naturally be judiciously selected:

the grade of low-alloy structural steel which constitutes the core of the composite part which is to be produced, which steel must make a non-fragile joint with the high-speed steel to be welded on the surface;

the grade of high-speed steel constituting the powder to be welded, in such a manner that the hardness of the coating will exceed a hardness of 57 Rockwell C, the welding process: transferred or semitransferred arc plasma torch, or laser torch;

the heat treatment: for example tempering or a series of successive temperings, or hardening followed by one or more temperings, for the purpose of transforming the residual austenite and precipitating the carbides in the hard layer.

Six examples of such choices are given later on.

The grades of high-speed steel which can be used for the powder coating or surfacing of the core are within the following ranges of composition:

(a) Chromium-tungsten steels:
| | | | |
|---|---|---|---|
| C %: | 0.6 to 1.5 | W %: | 10 to 20 |
| Cr %: | 2.5 to 7 | V %: | 0 to 6 |
| Mo %: | 0 to 3 | Co %: | 0 to 2 |

(b) Chromium-molybdenum steels:
| | | | |
|---|---|---|---|
| C %: | 0.6 to 1.5 | W %: | 0 to 5 |
| Cr %: | 3.5 to 5 | V %: | 0 to 4 |
| Mo %: | 3 to 12 | Co %: | 0 to 2 |

(c) Chromium-tungsten-molybdenum steels:
| | | | |
|---|---|---|---|
| C %: | 0.6 to 1.8 | W %: | 5 to 12 |
| Cr %: | 3.5 to 5 | V %: | 0 to 4 |
| Mo %: | 3 to 12 | Co %: | 0 to 2 |

(d) Chromium-tungsten-cobalt steels:
| | | | |
|---|---|---|---|
| C %: | 0.6 to 1.8 | W %: | 10 to 20 |
| Cr %: | 3.5 to 5 | V %: | 0 to 7 |
| Mo %: | 0 to 3 | Co %: | 2 to 14 |

(e) Chromium-molybdenum-cobalt steels:
| | | | |
|---|---|---|---|
| C %: | 0.5 to 1.4 | W %: | 0 to 5 |
| Cr %: | 3.5 to 5 | V %: | 0 to 5 |
| Mo %: | 3 to 12 | Co %: | 0.3 to 12 |

(f) Chromium-tungsten-molybdenum-cobalt steels:
| | | | |
|---|---|---|---|
| C %: | 0.7 to 1.9 | W %: | 5 to 12 |
| Cr %: | 3.5 to 5 | V %: | 0 to 7 |
| Mo %: | 3 to 12 | Co %: | 2 to 15 |

(g) Supercarburized chromium-tungsten-molybdenum-vanadium-cobalt steels:
| | | | |
|---|---|---|---|
| C %: | 1.1 to 2.6 | W %: | 4 to 12 |
| Cr %: | 3.5 to 7 | V %: | 2 to 10 |
| Mo %: | 3.3 to 7 | Co %: | 8 to 16 |

(h) Steels containing 12% of chromium:
| | | | |
|---|---|---|---|
| C %: | 1.4 to 2 | W %: | traces |
| Cr %: | 11 to 14 | V %: | 0.4 to 1 |
| Mo %: | 0.5 to 1.5 | Co % | 2.5 to 3.5 |

The advantages of the products obtained by the processes according to the invention are due on the one hand to their composite construction, and on the other hand to the coating or surfacing by the welding of a high-speed steel of great hardness, exclusively in the powder state, followed by heat treatment well suited to the grade of this steel.

The composite construction makes it possible to adapt the selected steels to their respective functions: mechanical durability for the core, resistance to fatigue and wear for the working layer, more effectively than in the case of homogeneous material.

The composite construction represents an obvious saving of precious materials, because only the working layer is made of expensive materials.

However, the invention offers the following additional advantages:

Because of the welding methods used, and because of the use of a high-speed steel powder of great hardness, the invention makes it possible to obtain coatings in which metallurgical defects such as porosities, inclusions, or segregations are absent, or are sufficiently slight not to become sites for the commencement of fatigue cracks in the parts under the action of cyclic stresses during operation (example: cyclic Hertz stresses in the case of rolls for cold rolling).

Moreover, the metal constituting the core of the composite part is selected from the composition range indicated above in such a manner that:

(1) It ensures a tenacious joint between the coating and the core, so that there is no risk of decohesion between the coating and the core through the action of operating stresses on the surfaced part;

(2) It provides the core with the mechanical strength properties desired for the specific use in question, after the heat cycles imposed on the core by the welding operation.

In the case of rolls for cold rolling mills, the manufacturing processes claimed also constitute a saving of energy and a saving in general in comparison with the hypothetical construction of rolls made entirely of high-speed steel. A roll made of solid high-speed steel would in fact require, in the hot transformation and heat treatment stages, a greater consumption of energy than in the case of manufacture by the processes claimed.

The composite construction makes it possible to extend to rolls of large diameter the benefits of a working layer of high-speed steel, whereas it would be difficult to contemplate the manufacture of these same rolls in solid high-speed steel, because of the technological and metallurgical difficulties that this would cause.

The manufacturing processes claimed make it possible to obtain a homogeneous structure in the hard layer deposited, with a fine distribution of carbides and without metallurgical defects of the inclusion or porosity type, which would be capable of impairing the endurance properties of the material when subjected to mechanical fatigue stresses.

The metal constituting the hard layer is applied in the form of powder in the processes claimed. This permits the use of supercarburized steels such as those mentioned above in (g), with a high proportion of $V_4C_3$ carbides, which are very efficient, even if these compositions are such that these steels could not be used by traditional welding means.

The performance of the rolls produced according to the invention (expressed for example as the tonnage rolled before deterioration of the surface necessitates reconditioning) is improved in comparison with traditional rolls because of the gains in respect of coefficient of friction and wear resistance. The performance of these rolls may be twice or three times as high as that of traditional rolls.

The surface quality of the products rolled with the rolls produced in accordance with the invention is greatly improved in comparison with products rolled with traditional rolls.

EXAMPLES

In order to enable the invention to be well understood, six forms of production of products according to the invention are described below as non-limitative examples.

FIRST EXAMPLE

Roll for the cold rolling of small strip.

The starting blank is taken from a rolled bar of low-alloy structural steel of the following composition:

| C % | Mn % | Si % | S % | Ni % | Cr % | Mo % | V % |
| --- | --- | --- | --- | --- | --- | --- | --- |
| 0.49 | 0.88 | 0.27 | 0.009 | 0.18 | 0.98 | 0.08 | 0.13 |

Its heat treatment comprised hardening and tempering for a hardness of 320 Brinell. The diameter of the blank is 170 mm. This blank is preheated to a temperature of 450° C. The steel constituting the hard layer is deposited by welding with the aid of a semitransferred arc plasma torch fed by two generators, supplying the blown arc and the transferred arc. The deposition is effected in juxtaposed beads with slight overlapping, in such a manner as to obtain a uniform surface, and in a plurality of layers in order to obtain the desired thickness. The steel constituting the hard layer is applied in the form of a powder of a particle size between 60 and 180 microns, with the following composition:

| C % | Mn % | Si % | S % | Ni % | Cr % | Mo % | W % | V % | Co % |
| --- | --- | --- | --- | --- | --- | --- | --- | --- | --- |
| 0.86 | 0.22 | 0.23 | 0.010 | 0.22 | 4.35 | 5.20 | 6.15 | 1.95 | 0.35 |

The blown or pilot arc current is 85 amperes. The transferred arc current is 195 amperes. The arc voltage is 32 volts. At the end of the hard surfacing operation the part has a diameter greater than or equal to 203 mm.

The part is cooled in still air to ambient temperature, thus ensuring natural hardening of the hard layer. The part then undergoes a double tempering heat treatment at 550° C., thus imparting to the deposited layer its optimum hardness, without affecting the hardness of the core. The working layer is then ground to the nominal diameter of the roll. Its surface hardness verified is 64 HRC (64 Hardness Rockwell C).

FIG. 1 is a vertical section of the roll obtained after grinding machining. The core 1 of low-alloy steel is thus coated on its working surface 2 with a layer 3 of high-speed steel of a thickness of about 15 mm.

After this layer 3 has worn in service, it is possible to resurface it by the process according to the invention.

SECOND EXAMPLE

Wire rolling roller.

FIG. 2a is a vertical half-section of the blank for the roller, with its two circular grooves.

FIG. 2b is a vertical half-section of the same roller after application of the invention and machining.

The starting blank is taken from a rolled bar of low-alloy structural steel of the following composition:

| C % | Mn % | Si % | S % | Ni % | Cr % | Mo % | V % |
| --- | --- | --- | --- | --- | --- | --- | --- |
| 0.40 | 0.70 | 0.73 | 0.005 | 0.095 | 3.18 | 0.81 | 0.29 | so that there is a higher content of chromium and molybdenum than in the preceding example.

Its heat treatment comprised hardening and tempering for a hardness of 360 Brinell.(*) The blank has a diameter of 192 mm and has two circular grooves.

(*) Brinell hardness according to AFNOR Standard NF A 03-152.

The blank is preheated to a temperature of 400° C. The steel constituting the hard layer is deposited by welding with the aid of a semitransferred arc plasma torch fed by two generators supplying the blown arc and the transferred arc. Hard-surfacing is effected in superposed beads. The first bead has a width of 10 mm. The superposed beads widen progressively to fill the entire width of the groove. The steel constituting the hard layer is applied in the form of powder of a particle size between 60 and 180 microns, with the following composition:

| C % | Mn % | Si % | S % | Ni % | Cr % | Mo % | W % | V % | Co % |
| --- | --- | --- | --- | --- | --- | --- | --- | --- | --- |
| 1.95 | 0.35 | 0.30 | 0.005 | less than 0.10 | 3.47 | 3.02 | 9.18 | 5.02 | 14.80 |

The blown or pilot arc current is 95 amperes. The transferred arc current is 190 amperes. The arc voltage is 30 volts.

At the end of the hard-surfacing operation the part is cooled naturally in still air to ambient temperature, thus ensuring the hardening of the deposited layer, and then undergoes five tempering heat treatments at 550° C. The hardness is 67 Rockwell C.

The part is machined to the nominal diameter and the grooves are ground to the desired profile, as shown in FIG. 2b, in which the core is designated 4 and the hard layer 5.

THIRD EXAMPLE

Roll for the cold rolling of wide strip.

FIG. 3 is a vertical section of the roll after the final machining operation.

The starting blank is taken from a rolled bar of low-alloy structural steel of the following composition:

| C % | Mn % | Si % | S % | Ni % | Cr % | Mo % | V % |
| --- | --- | --- | --- | --- | --- | --- | --- |
| 0.47 | 0.90 | 0.24 | 0.012 | 0.16 | 1.02 | 0.07 | 0.14 |

This is practically the same steel as in the first example.

Its heat treatment comprised hardening and tempering to a hardness of 340 Brinell. In the zone intended to receive the hard layer, the diameter of the blank is 174 mm. This blank is preheated to a temperature of 500° C. The steel constituting the hard layer is deposited by welding with the aid of a semitransferred arc plasma torch fed by two generators supplying the blown arc and the transferred arc.

The material is deposited in juxtaposed beads with a slight overlap, in such a manner as to obtain a uniform surface, and in a plurality of successive layers in order to obtain the desired thickness. The steel constituting the hard layer is applied in the form of a prealloyed powder of a particle size between 60 and 180 microns, with the following composition:

| C % | Mn % | Si % | S % | Ni % | Cr % | Mo % | W % | V % | Co % |
| --- | --- | --- | --- | --- | --- | --- | --- | --- | --- |
| 0.85 | 0.27 | 0.22 | 0.007 | 0.15 | 4.60 | 5.15 | 6.2 | 2.05 | 0.4 |

The blown or pilot arc current is 50 amperes. The transferred arc current is 215 amperes. The arc voltage is 33 volts.

In the course of the hard surfacing, the temperature of the part is kept above 360° C. by means of rows of heaters. At the end of the hard-surfacing operation the part must have a diameter greater than or equal to 202 mm. The heat balance of the operation makes it possible to effect the natural hardening of the steel deposited by simple natural cooling of the part in still air when the deposition is completed.

The part is thereupon subjected to double tempering heat treatment at 550° C., which imparts its optimum hardness to the deposited layer without affecting the hardness of the core.

The working layer is then ground to the nominal diameter of the roll. Its hardness is from 63 to 65 Rockwell C. The machining of the roll is completed in accordance with FIG. 3, in which the working surface 7 of the core 6 is covered with the hard layer 8.

FOURTH EXAMPLE

Circular shear blade.

Known types of manufacture lead either to solid, homogeneous shears of steel or to shears having a steel core and an attached crown of carbide.

The present embodiment of the invention may be applied in two possible ways:

The first solution is illustrated in FIG. 4.

It consists in circularly hard-surfacing, in accordance with the invention, ech of the two flanks 9 and 10 of the peripheral portion 11 of the core 12.

The second solution is shown in FIG. 5.

A bar is cut into slices. One of the slices 13 is hard-surfaced in accordance with the invention at 14 by plasma torch welding.

FIFTH EXAMPLE

Straight shear blade.

FIG. 6 is a vertical section of a straight shear blade according to the invention.

The core 15 of low-alloy steel is hard-surfaced at 16 with high-speed steel by plasma torch welding.

SIXTH EXAMPLE

Wear plate (or armour plate).

By plasma torch welding it is possible to deposit a layer of 6 to 12 millimeters of high-speed steel on a plate of low-alloy structural steel.

It is clearly understood that without departing from the scope of the invention it is possible to conceive variants and improvements of details, and also to contemplate the use of equivalent means.

We claim:

1. A process for producing a composite cold rolling roll or roller by coating or hard-surfacing a metal core of low-alloy structural steel with a harder metal layer composed of a high-speed steel containing chromium in a concentration from about 2% to about 14%, and at least one metal selected from the group consisting of tungsten in a concentration from about 10% to about 20%, molybdenum in a concentration from about 3% to about 12%, and cobalt in a concentration from about 2.5% to about 16%, wherein this high-speed steel is so selected as to exhibit a hardness higher than 57 Rockwell C and contains the following elements in a concentration range as follows:

C=0.5% to 2.6%
Mn=0.2% to 1.7%
Si=0.2% to 1.4%
S=at most 0.2%
V=at most 10%
with Mo%+W%+V%+Co% at least equal to 3,
wherein the low-alloy structural steel forming the metal core is so selected as to ensure a non-fragile connection to the high-speed steel and to be compatible with the utilisation stresses of the part, and has a composition within the range defined below:

| C   | = 0.2% to 1%       | Ni  | = 0% to 2.5%   |
|-----|--------------------|-----|----------------|
| Mn  | = 0.2% to 1.5%     | Cr  | = 0.5% to 6%   |
| Si  | = 0.2% to 1%       | Mo  | = 0% to 2%     |
| S   | = 0.005% to 0.200% | V   | = 0% to 0.5%,  | wherein the said high-speed steel is added solely in the form of a prealloyed powder, and the coating of hard-surfacing of the core with this powder is effected by welding the high-speed steel to the metal core by means of one of the welding processes of the following group: welding by means of a transferred or semi-transferred arc plasma torch, or welding by means of a laser torch, the operation of coating or hard-surfacing by welding being followed by tempering heat treatment, or by hardening and tempering heat treatment adapted to the nature of the powder used.

2. A production process as claimed in claim 1, wherein the high-speed steel powder also has a content of boron at most equal to 2%.

3. A production process as claimed in claim 1, wherein the high-speed steel powder also has a content of aluminum at most equal to 1.2%.

4. A process according to claim 1 wherein the high-speed steel contains chromium in a concentration range from about 3.5% to about 7% and at least one member selected from the group consisting of tungsten in a concentration from about 10% to about 20% and cobalt in a concentration from about 8% to about 16%.

5. A process according to claim 1 wherein the high-speed steel contains chromium in a concentration range from about 3.5% to about 7% and at least one member selected from the group consisting of tungsten in a concentration from about 5% to about 12% and molybdenum in a concentration from about 3% to about 12%.

6. A process according to claim 1 wherein the high-speed steel has a composition as follows:

| C =  | 0.6% to 1.5% | Cr = | 2.5% to 7%  |
|------|--------------|------|-------------|
| Mn = | 0.2% to 1.7% | Mo = | 0% to 3%    |
| Si = | 0.2% to 1.4% | W =  | 10% to 20%  |
| S =  | at most 0.2% | V =  | 0% to 6%    |
|      |              | Co = | 0% to 2%.   |

7. A process according to claim 5 wherein the high-speed steel has a composition as follows:

| C =  | 0.6% to 1.5% | Cr = | 3.5% to 5%  |
|------|--------------|------|-------------|
| Mn = | 0.2% to 1.7% | Mo = | 3% to 12%   |
| Si = | 0.2% to 1.4% | W =  | 0% to 5%    |
| S =  | at most 0.2% | V =  | 0% to 4%    |
|      |              | Co = | 0% to 2%.   |

8. A process according to claim 5 wherein the high-speed steel has a composition as follows:

| | | | |
|---|---|---|---|
| C = | 0.6% to 1.8% | Cr = | 3.5% to 5% |
| Mn = | 0.2% to 1.7% | Mo = | 3% to 12% |
| Si = | 0.2% to 1.4% | W = | 5% to 12% |
| S = | at most 0.2% | V = | 0% to 7% |
| | | Co = | 0% to 2%. |

9. A process according to claim 4 wherein the high-speed steel has a composition as follows:

| | | | |
|---|---|---|---|
| C = | 0.6% to 1.8% | Cr = | 3.5% to 5% |
| Mn = | 0.2% to 1.7% | Mo = | 0% to 3% |
| Si = | 0.2% to 1.4% | W = | 10% to 20% |
| S = | at most 0.2% | V = | 0% to 7% |
| | | Co = | 2% to 14%. |

10. A process according to claim 5 wherein the high-speed steel has a composition as follows:

| | | | |
|---|---|---|---|
| C = | 0.5% to 1.4% | Cr = | 3.5% to 5% |
| Mn = | 0.2% to 1.7% | Mo = | 3% to 12% |
| Si = | 0.2% to 1.4% | W = | 0% to 5% |
| S = | at most 0.2% | V = | 0% to 5% |
| | | Co = | 0.3% to 12%. |

11. A process according to claim 5 wherein the high-speed steel has a composition as follows:

| | | | |
|---|---|---|---|
| C = | 0.7% to 1.9% | Cr = | 3.5% to 5% |
| Mn = | 0.2% to 1.7% | Mo = | 3% to 12% |
| Si = | 0.2% to 1.4% | W = | 5% to 12% |
| S = | at most 0.2% | V = | 0% to 7% |
| | | Co = | 2% to 15%. |

12. A process according to claim 4 wherein the high-speed steel has a composition as follows:

| | | | |
|---|---|---|---|
| C = | 1.1% to 2.6% | Cr = | 3.5% to 7% |
| Mn = | 0.2% to 1.7% | Mo = | 3.3% to 7% |
| Si = | 0.2% to 1.4% | W = | 4% to 12% |
| S = | at most 0.2% | V = | 2% to 10% |
| | | Co = | 8% to 16%. |

13. A process according to claim 1 wherein the high-speed steel has a composition as follows:

| | | | |
|---|---|---|---|
| C = | 1.4% to 2% | Cr = | 11% to 14% |
| Mn = | 0.2% to 1.7% | Mo = | 0.5% to 1.5% |
| Si = | 0.2% to 1.4% | W = | traces |
| S = | at most 0.2% | V = | 0.4% to 1% |
| | | Co = | 2.5% to 3.5%. |

14. Rolls for cold rolling mills, manufactured as claimed in any one of claims 1, 2 or 3, wherein the metal core of low-alloy structural steel constitutes the central portion of the roll, and the harder metal layer of high-speed steel constitutes the surface layer which alone comes into contact with the products which are to be rolled.

15. Rollers for cold rolling or cold forming solid and hollow sections, which rollers are produced as claimed in any one of claims 1, 2 or 3 and wherein the metal core of low-alloy structural steel constitutes the central portion of the roller and wherein the harder metal layer of high speed steel constitutes the surface layer which alone comes into contact with the products which are to be rolled or formed.

* * * * *

UNITED STATES PATENT AND TRADEMARK OFFICE
CERTIFICATE OF CORRECTION

PATENT NO. : 4,484,959

DATED : November 27, 1984

INVENTOR(S) : Boucher et al

It is certified that error appears in the above-identified patent and that said Letters Patent is hereby corrected as shown below:

In column 11, claim 11 should read as follows:

A process according to claim 5 wherein the high-speed steel has a composition as follows:

| | |
|---|---|
| C = 0.7% to 1.9% | Cr = 3.5% to 5% |
| Mn = 0.2% to 1.7% | Mo = 3% to 12% |
| Si = 0.2% to 1.4% | W = 5% to 12% |
| S = at most 0.2% | V = 0% to 7% |
| | Co = 2% to 15% |

Signed and Sealed this

Ninth Day of April 1985

[SEAL]

Attest:

DONALD J. QUIGG

Attesting Officer     Acting Commissioner of Patents and Trademarks